United States Patent [19]
Eatwell

[11] Patent Number: 5,742,694
[45] Date of Patent: Apr. 21, 1998

[54] NOISE REDUCTION FILTER

[76] Inventor: Graham P. Eatwell, 6395C Smithy Sq., Glen Burnie, Md. 21061

[21] Appl. No.: 679,245

[22] Filed: Jul. 12, 1996

[51] Int. Cl.$^6$ .................................................. H04B 15/00
[52] U.S. Cl. ............................................................ 381/94.2
[58] Field of Search ................................ 381/94.2, 94.1, 381/94.3, 73.1; 395/2.35

[56] References Cited

U.S. PATENT DOCUMENTS

| | | |
|---|---|---|
| 3,403,224 | 9/1968 | Schroeder . |
| 4,025,721 | 5/1977 | Graupe et al. . |
| 4,185,168 | 1/1980 | Graupe et al. . |
| 4,658,426 | 4/1987 | Chabries et al. . |
| 4,703,507 | 10/1987 | Holden . |
| 5,012,519 | 4/1991 | Adlersberg et al. . |
| 5,125,030 | 6/1992 | Nomura et al. ............... 395/2.35 |
| 5,148,488 | 9/1992 | Chen et al. . |
| 5,212,764 | 5/1993 | Ariyoshi . |
| 5,402,496 | 3/1995 | Soli et al. .................. 381/94.2 |
| 5,406,622 | 4/1995 | Silverberg et al. . |
| 5,406,632 | 4/1995 | Sogo et al. ................. 395/2.35 |
| 5,533,133 | 7/1996 | Lamkin et al. . |
| 5,590,241 | 12/1996 | Park et al. ................. 395/2.35 |

FOREIGN PATENT DOCUMENTS 9515550  6/1995  WIPO .

OTHER PUBLICATIONS

'Adaptive Noise Cancelling for Speech Signals', M.R. Sambur, IEEE Transactions on Acoustics, Speech and Signal Processing, vol., ASSP-26, No. 5, Oct. 1978, pp. 419–423.
'Filtering of Colored Noise for Speech Enhancement and Coding', B. Koo et al, Proceedings of ICASSP-89, May 1989, Glasgow, Scotland, vol. 1, pp. 349–352.
'Improvements to the Noise Reduction Neural Network', Shin'ichi Tamura et al, Proceedings of ICASSP-90, pp. 825–828, Apr. 1990, Albuquerque, NM.
'Predictable Processes and Wold's Decomposition: A Review', A. Papoulis IEEE Transactions on Acoustics, Speech, and Signal Processing, vol. ASSP-33 No. 4, Aug. 1965.
'Suppression of Acoustic Noise in Speech Using Spectral Subtraction' S.F. Boll, IEEE Transactions of Acoustics, Speech, and Signal Processing, vol. ASSP-27, No. 2, Apr. 1979, pp. 113–120.
'Evaluation of Short Term Spectral Attenuation Techniques for the Restoration of Musical Recordings', O. Cappe, IEEE Transactions on Speech and Audio Processing, vol. 3, No. 1, Jan. 1995, pp. 84–93.
'Neural Networks Expand SP's Horizons', Haykin, IEEE Signal Processing Magazine, (Mar. 1996) pp. 24–49.
'Adaptive Signal Processing', B. Widrow and S.D. Stearns, Prentice Hall 1985, pp. 376–379.
'Enhancement and Bandwidth Compression of Noisy Speech', J.S. Lim and A.V. Oppenheim, Proceeding of IEEE, vol. 67, No. 12, Dec. 1979, Sec.V,pp. 1586–1604.
'Discrete Time Processing of Speech Signals', J.R. Deller, Jr. et al Macmillian Publishing Company, NY, 1993, Sec.IV, Ch. 8, pp. 501–552.
'Processing Speech Signals to Attenuate Interference', M.R. Wiess et al, Proceedings of IEEE Symposium on Speech Recognition, Carneige Mellon Univ. Apr. 1974, pp. 292–295.

*Primary Examiner*—Curtis Kuntz
*Assistant Examiner*—Vivian Chang
*Attorney, Agent, or Firm*—Michael de Angeli

[57] ABSTRACT

A noise reduction filter for enhancing noisy audio signals, such as speech or music. In accordance with the invention, a noisy signal is passed through a first adaptive prediction filter so as to obtain a first signal component corresponding to the predictable part of the noisy signal and a second signal component corresponding to a prediction error. The first and second signal components are each attenuated respectively, according to the levels of signal and noise in each component, and then recombined to form an enhanced output signal.

28 Claims, 8 Drawing Sheets

NOISE REDUCTION FILTER

FIELD OF THE INVENTION

The present invention relates to the filtering of signals, such as speech or music signals, to remove unwanted noise.

BACKGROUND OF THE INVENTION

The reduction of noise in signals has been the focus of much research over the years. The last 20 years has seen an increasing interest in the use of digital filtering for noise reduction. More recently, the proliferation of portable digital devices for communication, hearing aids, radio etc. has led to a demand for more efficient and effective noise reduction techniques.

A large variety of techniques have been used to filter noise from signals. Many of the fundamental approaches are reviewed in the article 'Enhancement and Bandwidth Compression of Noisy Speech', J. S. Lim and A. V. Oppenheim, Proceedings of IEEE, Vol. 67, No 12, December 1979, Section V, pp1586–1604. A more recent review is given in the book 'Discrete Time Processing of Speech Signals', J. R. Deller, J. G. Proakis and J. H. Hansen, Macmillan Publishing Company, New York, 1993, section IV, chapter 8, pp 501–552.

Some of the basic techniques are summarized here for comparison.

Gain Adjustment

The simplest noise reduction systems reduce noise in a noisy signal, which contains signal and noise components, by reducing gain during pauses in the signal component. An example of such a system is given in U.S. Pat. No. 5,533,133 (Lamkin et al). This technique is designed to reduce listener fatigue, however, it is not a signal enhancement system since it does not reduce noise when the signal component is present.

Adaptive Noise Cancelation

This approach requires that, in addition to the noisy signal, a second signal is available as a reference signal. The second signal should preferably contain noise only, but the approach can be modified to cases where signal and noise are present in both signals (e.g. U.S. Pat. No. 5,406,622 (Silverberg et al)). However, in most applications of commercial interest, only the single noisy signal is available, so this approach cannot be used.

Spectral Subtraction

The spectral subtraction technique is described by M. R. Wiess et al, 'Processing Speech Signals to Attenuate Interference', Proceedings of the IEEE Symposium on Speech Recognition, Carnegie Mellon University, April 1974, pp 292–295, and has its roots in a speech coder described in U.S. Pat. No. 3,403,224 (Schroeder). The technique has been used and modified extensively, e.g. S. F. Boll 'Suppression of Acoustic Noise in Speech Using Spectral Subtraction', IEEE Transactions on Acoustics, Speech and Signal Processing, Vol. ASSP-27, No. 2, April 1979, U.S. Pat. No. 4,185,168 (Graupe), U.S. Pat. No. 5,012,519 (Adlersberg et al), U.S. Pat. No. 5,212,764 (Ariyoshi) and WO 95/15550 (Wynn).

The basic system of Graupe is shown in FIG. 1. The input signal is passed through a bank of fixed band pass filters (BPF 1, BPF 2, . . . ,BPFn) to obtain a number of filtered signals. These signals are multiplied by variable gains and summed in the summing circuit. The gains are set according to estimates of the levels of signal and noise in each frequency band. The noise levels are assumed to be fairly constant.

The spectral subtraction technique has been used mainly for removing noise from speech signals, but has also been applied to music signals (e.g. O. Cappe, 'Evaluation of Short Term Spectral Attenuation Techniques for the Restoration of Musical Recordings', IEEE Transactions on Speech and Audio Processing, Vol. 3, No 1, January 1995).

The system of Graupe is designed for analog implementation but may be modified for digital implementation by replacing the filter bank with a Fast Fourier Transform, which requires much less computation.

One major disadvantage of the spectral subtraction technique is that it operates on consecutive blocks of signal, and hence a significant processing delay is introduced. (In the filter bank approach there is an equivalent delay.) In addition, expensive high speed memory is needed to store blocks of data and coefficients.

Another disadvantage is the generation of noise artifacts described as 'musical tones'. Attempts to reduce these tones usually result in reduced levels of noise reduction and increased processing requirements.

Comb Filtering

Adaptive prediction filters can be used as line enhancers to enhance the periodic components of speech. Sambur ("Adaptive Noise Cancelling for Speech Signals", IEEE Transactions on Acoustics, Speech and Signal Processing, Vol. ASSP-26, No. 5, October 1978, pp 419–423) describes such a system for application to speech enhancement. This system is also known as an adaptive line enhancer, since it enhances tonal components of the signal. A block diagram of the system is shown in FIG. 2. A reference signal is obtained by delaying the input signal. In Sambur's system the delay is adjusted to be one pitch period of the speech. In other systems the delay is fixed. The reference signal is passed through an adaptive filter to provide the enhanced signal. The difference between the enhanced signal and the input signal is used to adapt the filter. In order to minimize this error, the filter must use the delayed signal to predict the current signal. Another version of this approach is described in U.S. Pat. No. 4,658,426 (Chabries et al), where a fixed delay of 1–3 ms is used and Fourier transforms are used to improve the adaptation rate of the filter. This method only enhances the tonal components of the signal, and tends to cancel other components of the signal along with the noise, resulting in 'muffled' speech. Since speech and music both contain a mixture of tonal and non-tonal (unvoiced or broadband) components, this method on its own does not provide a complete solution to the problem.

Kalman Filtering

The application of the well known Kalman or Wiener filters to speech enhancement is described in U.S. Pat. No. 4,025,721 (Graupe et al.) where the noise parameters are estimated during pauses in the speech. More recently, the Kalman filter approach is described in 'Filtering of Colored Noise for Speech Enhancement and Coding', B. Koo and J. 'D. Gibson, Proceedings of ICASSP-89, May 1989, Glasgow, Scotland, Vol. 1, pp 349–352. The implementation requires extensive matrix manipulations at each processing step and so is not well suited to low cost applications. Further, the recursive nature of the algorithm makes it prone to numerical instabilities.

A simplified version of the algorithm, which assumes that the noise is white, is described in 'Method and Filter for Enhancing a Noisy Speech Signal' W. Y. Chen and R. A. Haddad, U.S. Pat. No. 5,148,488. (1992). This method uses a limiting Kalman filter which takes no account of the time varying nature of speech or music. As a consequence, even though the algorithm is well suited to on-line implementation, only limited noise reduction is obtained.

Artificial Neural Networks

Artificial Neural Networks have been developed for speech enhancement, see for example 'Improvements to The Noise Reduction Neural Network', S. Tamura and M. Nakamura, Proceedings of ICASSP-90, pp 825–828, April 1990, Albuquerque, N. Mex., USA.

These systems are computationally expensive, since typically 50–100 inputs and several layers are used, and require extensive off-line training. In addition, they operate in a block processing mode which introduces delay into the signal path.

SUMMARY OF THE INVENTION

The present invention provides a method and filter for enhancing noisy signals, particularly audio signals such as speech or music signals.

One object of the invention is to provide a noise reduction filter with low computation and memory requirements.

Another object of the invention is to provide a noise reduction filter with very little or no throughput delay.

Another object of the invention is to provide a noise reduction filter that provides a high degree of noise attenuation.

A still further object of the invention is to provide a noise reduction filter which can reduce both white noise and colored noise.

In accordance with the present invention, a noisy signal is passed through a first adaptive prediction filter so as to obtain a first signal component corresponding to the predictable part of the noisy signal and a second signal component corresponding to a prediction error. The first and second signal components are each attenuated, according to the levels of signal and noise in each component, and then recombined to form an enhanced output signal.

This method of noise reduction requires a small amount of processing in comparison with other techniques. Further, since the method introduces virtually no delay into the signal path, it is well suited to application in communication systems and hearing aids.

The method may be further improved for spectrally colored noise signals by the addition of a second prediction filter which acts to remove the predictable component of the noise from the input signal.

DETAILED DESCRIPTION OF THE INVENTION

Figure 1:
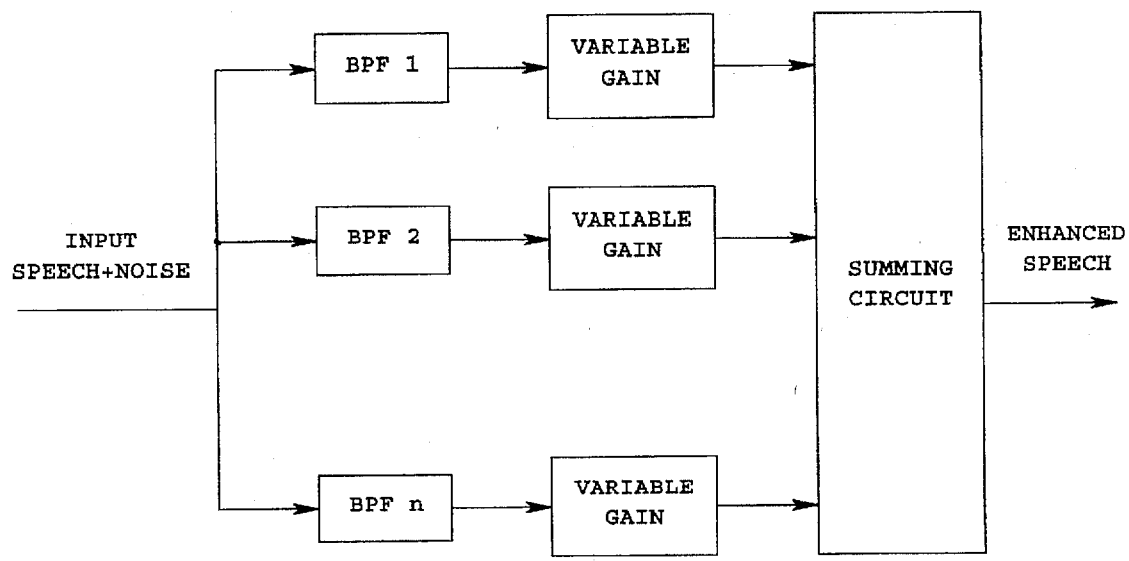
FIG. 1 is a block diagram of a spectral subtraction filter of the prior art.
Figure 2:
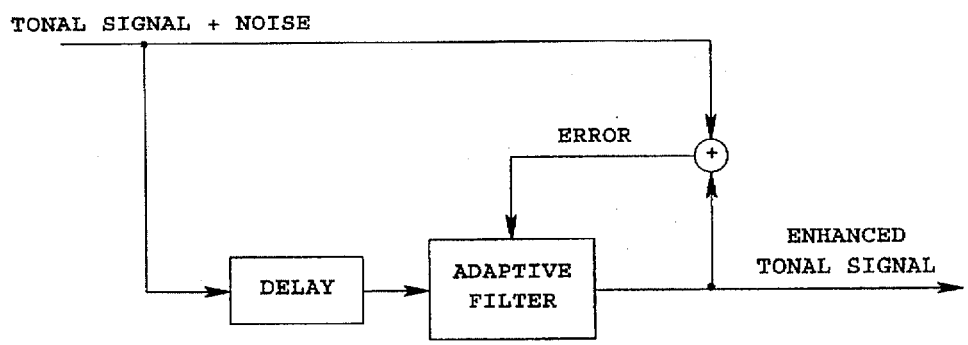
FIG. 2 is a block diagram of an adaptive line enhancer of the prior art.
Figure 3:
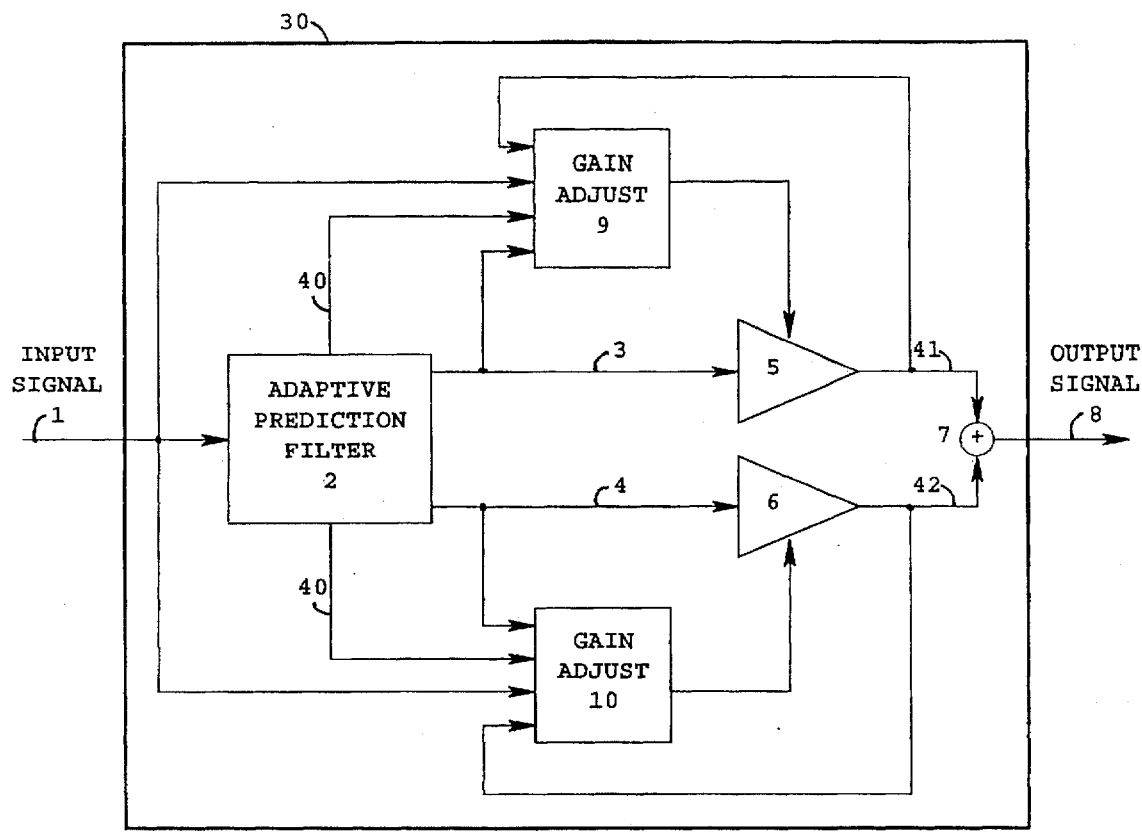
FIG. 3 is a simplified block diagram of the noise reduction filter of the invention.

The basic noise reduction filter (30) of the invention is shown in FIG. 3. The noisy signal, input signal (1), is supplied to an adaptive prediction filter (2), discussed with respect to FIG. 4 below, which separates the signal into a predictable component (3) and a prediction error component (4). These components are attenuated by attenuators (5) and (6) respectively to obtain attenuated components (41) and (42) which are combined at summer (7) to form the output signal (8). The attenuation levels are adjusted by gain adjusters (9) and (10) dependent upon the levels of the components (3) and (4) and estimates of the noise levels therein. These noise levels may be estimated from the level of the input signal (1) and the coefficients (40) of the filter (2). Accordingly, as indicated in FIG. 3, the first and second gain adjusters (9) and (10) are also responsive to input signal (1) and filter coefficients (40). In a particular preferred embodiment, also shown in FIG. 3, the attenuation levels are also dependent on the levels of the previous outputs (41) and (42) from the attenuators (5) and (6).

The operation of the adaptive prediction filter will now be described in more detail with reference to a particular embodiment.

Prediction Filter

For simplicity, the operation of the adaptive prediction filter (2) is first described for the case of a signal corrupted by white noise. The method will be described as a sampled data system, although an analog implementation may be used. The signal element of the noisy signal at time sample n is denoted by s(n) and the noise element is denoted by w(n). The noisy signal, which is the input signal, is given by sum $$x(n)=s(n)+w(n). \quad (1)$$

In the first processing stage of the current invention the signal is passed through a prediction filter. Examples of such prediction filters will now be described.

It is well known that the current value of any signal can be decomposed as the sum of a predictable part, which may be determined from previous samples of the signal, and a prediction error. This decomposition of a signal is related to Wold's decomposition (for example, see A. Papoulis, 'Predictable Processes and Wold's Decomposition: A Review', IEEE Transactions on Acoustics, Speech and Signal Processing, Vol. ASSP-33, No. 4, August 1985). The signal s(n) can be written as $$s(n)=p_s(n)+e_s(n) \quad (2)$$

where $p_s(n)$ is the prediction of $s(n)$, which is obtained from a weighted sum of the N previous samples, i.e.

$$p_s(n) = \sum_{k=1}^{N} a(n,k)s(n-k) \qquad (3)$$

where $\alpha(n,k)$ denotes the $k^{th}$ weighting at time sample n. p(n) is the predictable component of s(n). This expression for p(n) can be recognized as a moving average (finite impulse response) filter acting on the delayed signal. The filter is called a prediction filter. The filter coefficients may be found by minimizing the prediction error.

The noisy signal x(n) can be decomposed similarly, using the same filter, as $$x(n) = p(n) + e(n) \qquad (4)$$

where $$p(n) = \sum_{k=1}^{N} a(n,k)x(n-k) \qquad (5)$$

is the predictable component of x(n) and $$e(n) = x(n) - p(n) \qquad (6)$$

is the corresponding prediction error component. In general, the addition of white noise makes it more difficult to predict the signal. In general p(n) will be different from $p_s(n)$ even though the noise is not predictable. Further, p(n) will contain noise unless all of the weightings $\alpha(n,k)$ are zero.

More generally, the prediction can be obtained as $$p(n) = \sum_{k=-L}^{N} a(n,k)x(n-k), \qquad (7)$$

where L may be positive, negative or zero. When $L \geq 0$, the weighted sum includes the current input signal, so the filter coefficients are constrained so as to prevent $\alpha(n,0)$ from becoming unity. The remainder of the signal, $(1-\alpha(n,0))x(n)$, must still be predicted from the past values, so this may still be described as a prediction filter. The expression 3 results from constraining $\alpha(n,0)$ to be zero. Alternatively, the sum of squares of filter coefficients may be constrained to be less than some value or the mean square output level may be constrained. Standard techniques such as the method of Lagrange multipliers can then be used to calculate the coefficients. These techniques also lead to iterative algorithms such as the 'leaky' LMS algorithm (see, for example, 'Adaptive Signal Processing', B. Widrow and S. D. Stearns, Prentice Hall 1985, pp376–379).

For example, the mean square value of the error may be minimized subject to a constraint on the coefficients of the form $$a^T \Lambda a = \alpha_0, \qquad (8)$$

where $\Lambda$ is positive, semi-definite, weighting matrix, $a = \{\alpha(-L), \alpha(\alpha(-L+1), \ldots, \alpha(N-1), \alpha(N)\}^T$, is the vector of filter coefficients, $\alpha_0$ is a constant and the angled brackets denote the expected value. The coefficients may be found by minimizing the cost function $$C(a) = \{e^2(n)\} + \lambda(a^T \Lambda a - \alpha_0), \qquad (9)$$

where $\lambda$ is a Lagrange multiplier, which may be treated as a parameter. The minimum value is found by setting the gradient of C with respect to the coefficients, $\nabla C$, to zero.

The gradient is $$\nabla C = -2\langle x(n)e(n)\rangle + 2\lambda\Lambda a \qquad (10)$$

$$= -2\langle x(n)x(n) - x(n)x^T(n)a\rangle + 2\lambda\Lambda a \qquad (11)$$

where x is the vector of filter inputs. The optimal coefficients satisfy $$(\{x(n)x(n)^T\} + \lambda\Lambda)a = \{x(n)x(n)\}. \qquad (12)$$

This equation may be solved by standard techniques to give the values of the coefficients a. Alternatively, the coefficients may be found using an iterative technique. The expected value may be replaced with an average over m samples and then a gradient descent algorithm can be used (see for example Widrow et al, pp 46–52). The block gradient descent algorithm calculates new coefficients iteratively according to $$a(n+m) = a(n) + \frac{\mu}{2} \nabla C = (I - \mu\lambda\Lambda)a(n) + \frac{\mu}{m} \sum_{j=0}^{m-1} x(n+j)e(n+j). \qquad (13)$$

When m=1 this is known as the stochastic gradient or LMS algorithm.

When L>0, the filter uses future samples of the noisy signal, so the output from the filter is delayed. This corresponds to a backward prediction filter.

Figure 4:
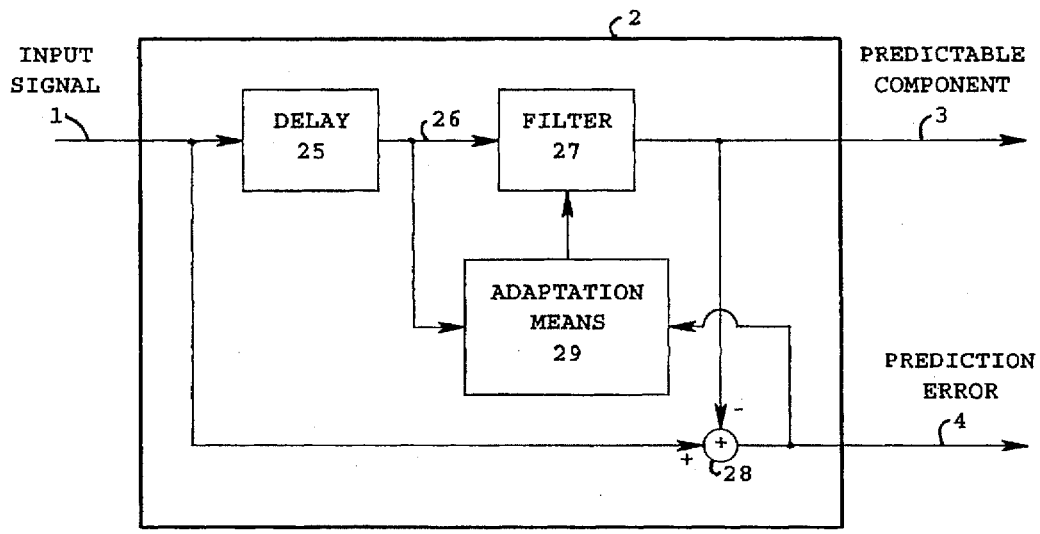
FIG. 4 is a block diagram of an adaptive prediction filter used in the invention.

In the preferred embodiment of the adaptive prediction filter (2), only past samples of the signal are used. This is equivalent to constraining the coefficient $\alpha(n,0)$ to be zero. This embodiment is shown in FIG. 4. When noise only is input to the adaptive prediction filter (3), the coefficients will tend to converge to zero, thereby minimizing the predictable component (3). Decomposition of the noisy signal into predictable component (3) and prediction error (4), is achieved by passing the signal through a prediction filter (2). The input signal (1) is delayed in delay means (25) to obtain a value for the previous input signal (26) which is input to filter (27) with coefficients $\alpha(n,k)$. The output (3) from the filter (27) is the predictable component, p(n). This predictable component is subtracted from the input signal (1) at (28) to produce the prediction error signal (4). The prediction error signal and the filter input signal (26) are used by adaptation means (29) to adjust the coefficients of the filter (27).

Filters of this kind are used in Linear Predictive Coding (LPC) algorithms for speech and there are many well documented techniques for finding the coefficients (including point-by-point algorithms, such as the LMS algorithm, and block algorithms such as the auto-correlation method (Levinson-Durbin recursion) and the covariance method etc.(see Deller et al. pp 290–302). The optimal filter minimizes the prediction error. For stationary signals, the resulting predictable component and prediction error component are orthogonal in that $\{p(n)e(n)\}=0$. Consequently, in one embodiment of the invention the attenuator gains are set independent of one another.

The optimal coefficients for predicting the signal element satisfy $$Sa = s \qquad (14)$$

where $a = \{\alpha(1), \alpha(2), \ldots, \alpha(N)\}^T$, is the vector of filter coefficients, S is the auto-correlation matrix of the signal, which has elements $$S_{ij} = \{s(n-i)s(n-j)\}, \qquad (15)$$

and $s = \{s_1, s_2, \ldots, s_N\}^T$ is the auto-correlation vector of the signal, which has elements $$s_i = \{s(n-i)s(n)\} \tag{16}$$

We have assumed that the noise is white, hence the auto-correlation matrix of the noisy signal is $$R_{ij} = \{x(n-i)x(n-j)\} = S_{ij} + \sigma^2 \delta_{ij} \tag{17}$$

where $\sigma^2$ is the power of the white noise, $\delta_{ij}$ is the Kronecker delta and the auto-correlation vector is $$r_i = \{x(n-i)x(n)\} = s_i. \tag{18}$$

Hence, to calculate the coefficients for the prediction filter for the signal element, we can measure the auto-correlation of the noisy signal and the auto-correlation of the noise and solve $$(R - \sigma^2 I)a = r \tag{19}$$

which is equivalent to equation 14.

This technique is suitable for applications where throughput delay is not important. For other applications a recursive calculation of the filter coefficients may be used. In this case the adaptation means (29), may use a gradient descent algorithm, such as the block gradient or stochastic gradient algorithms described above. In the normalized LMS algorithm, the filter coefficients are updated according to $$a(n, k) = \beta a(n-1, k) + \mu x(n-k)e(n), \tag{20}$$

where $$\chi^2(n) = \sum_{j=1}^{N} x^2(n-j), \tag{21}$$

$$\mu = \frac{\mu_0}{\epsilon + \chi^2(n)}, \tag{22}$$

and $\beta = e^{-T_s/T}$ is a constant related to the timescale, $T$, of signal transients and the sampling period, $T_s$, $\mu_0$ is the adaptation step size and $\epsilon$ is a constant to prevent the normalized step size, $\mu$, from becoming too large.

This algorithm may be modified to account for the noise in the signal by using $$a(n, k) = \begin{cases} (\beta + \mu\sigma^2)\alpha(n-1, k) + \mu x(n-k)e(n), & \text{if } \chi^2(n) > N\sigma^2 \\ \beta a - (n-1, k) + \mu x(n-k)e(n), & \text{otherwise,} \end{cases} \tag{23}$$

where $\sigma^2$ is an estimate of the power in the white noise signal. A similar algorithm is described in U.S. Pat. No. 5,148,488, where it is used to identify parameters of a speech model, but this algorithm did not take account of the level of the input signal, $\chi^2(n)$. The algorithm may become unstable if the factor $(\beta + \mu\sigma^2)$ becomes too large. This instability may be avoided by constraining the factor.

For stationary signals, with $\beta = 1$, this algorithm converges in the mean when the expected value of the change to $\alpha(n,k)$ is zero, i.e. when $$\sigma^2 \alpha(k) + \{x(n-k)e(n)\} = 0 \tag{24}$$

This gives $$\sum_{j=1}^{N} [R_{jk} - \sigma^2 \delta_{kj}]a(j) = r_k \tag{25}$$

where R is the auto-correlation function for the noisy signal. As described above, $R_{jk} - \sigma^2 \delta_{kj}$ can be recognized as the auto-correlation matrix for the signal, and the resulting filter is a prediction filter for the noise free signal $s(n)$, rather than the noisy signal $x(n)$. This result only holds for white noise.

Other types of prediction filters may be used, including lattice predictors and non-linear predictors (such as neural networks—see, for example, "Neural Networks Expand SP's Horizon", S. Haykin, IEEE Signal Processing Magazine, March 1996, Vol. 13, No. 2). Lattice predictors (see, for example, Deller et al, pp 304–307) have a simple structure which yields the (forward) prediction error directly. This prediction error can be subtracted from the original input signal to give the predictable component of the signal. The adaptation of the lattice coefficients can be modified in a similar manner so as to obtain a prediction filter for the clean signal.

Figure 5:
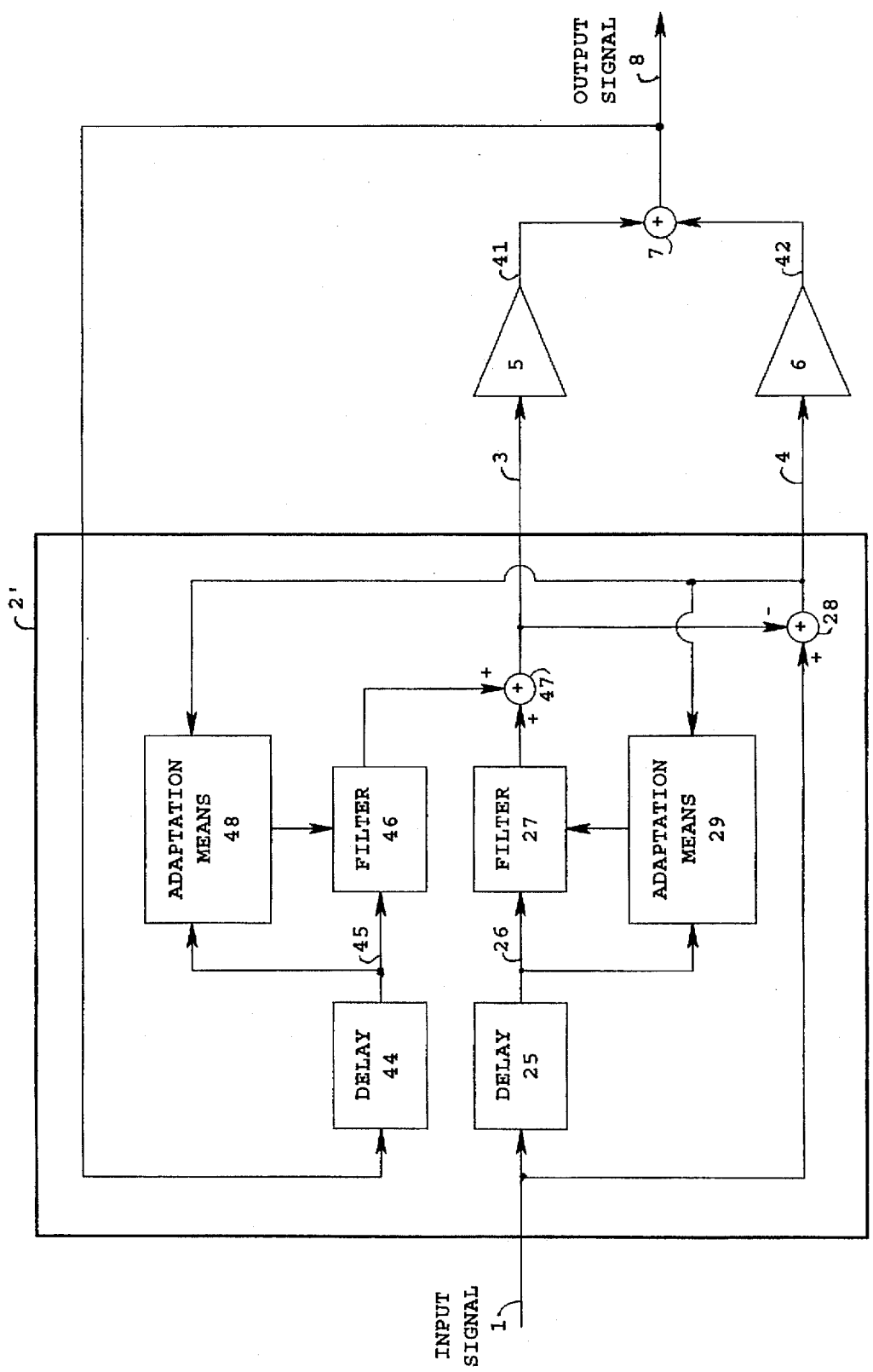
FIG. 5 is a block diagram of a further adaptive prediction filter used in the invention.

Auto-regressive, moving average (ARMA) prediction filters may also be used. In these filters, previous values of the predictable component and the input are used to predict the current input. In one embodiment of the current invention, the filter, (2') in this embodiment, is modified so as to thus use previous values of the filter output signal (8) or previous values of the attenuated predictable component (41). An example of such a filter is shown in FIG. 5. An additional delay means (44) is provided which receives either the output signal (8) as shown in the diagram, or the attenuated predictable component (41). The output (45) from the delay means (44) is passed through filter (46). The output of filter (46) is combined with the output from filter (27) at summer (47) to produce the predictable component (3). The coefficients of filter (46) are adjusted by adaptation means (48), which is responsive to the prediction error signal (4) and the filter input (45). The adaptation means adjusts the coefficients of the filters (27) and (46) so as to minimize the prediction error (4). It may operate according to a gradient descent algorithm, such as the block LMS algorithm described above. In this configuration, the filter adaptation means (48) and (29) may operate independently or together. For example, the adaptation step sizes may both be normalized by the factor $\epsilon + I^2(n) = \epsilon + \Sigma_{j=1}^{N} x^2(n-j) + \Sigma_{j=1}^{J} y^2(n-j)$, where J is the number of coefficients in filter (46).

The operation of the attenuators (5) and (6) in FIG. 3 and the adjustment thereof will now be described in more detail for a particular embodiment.

Gain Adjustment

The output from the filter of the present invention is obtained by attenuating and summing the predictable component signal and the prediction error signal, so that the output is given by $$y(n) = K_p(n)p(n) + K_e(n)e(n) \tag{26}$$

where $K_p(n)$ and $K_e(n)$ are time varying attenuation factors. Henceforth these attenuation factors will be called gains, even though the gains will normally be less than unity.

The gains are adjusted according to estimates of the signal and noise contents of the signal components. When a signal component has a high signal-to-noise ratio, the gain should be set close to unity to allow the signal component to pass. When a signal component has a low signal-to-noise ratio, it is desirable to reduce the level of the component so as to reduce the noise in the output signal. Similar gain elements are used in the spectral subtraction method. However, unlike the spectral subtraction method, the components in the current invention are obtained via a time-varying transformation rather than a fixed transformation (Fourier Transform or band pass filter). This means that even though the noise input signal may have stationary characteristics, the noise in the prediction components has a variable level. Hence existing techniques may not be used.

A method for obtaining estimates of the variable noise levels will now be described. Since the noise signal is assumed to be white, the power of the signal p(n) is approximated by $$P^2(n) = <p^2(n)> = <s^2(n)> + \sigma_p^2(n) \qquad (27)$$

where $$\sigma_p^2(n) = <\left(\sum_{j=1}^{N} a(n,j)w(n-j)\right)^2> = \sigma^2 \sum_{j=1}^{N} a^2(n,j) \qquad (28)$$

Hence, the variable noise level may be obtained by multiplying the input power level, $\sigma^2$, by the sum of squares of filter coefficients, $\Sigma_{j=1}^{N}\alpha^2(n,j)$. Similarly, the power in the prediction error component is approximated by $$E^2(n) = <e^2(n)> = <e^2(n)> + \sigma_e^2(n) \qquad (29)$$

where $$\sigma_e^2(n) = \qquad (30)$$

$$<\left(w(n) - \sum_{j=1}^{N} \alpha(n,j)w(n-j)\right)^2> = \sigma^2 \left(1 + \sum_{j=1}^{N} \alpha^2(n,j)\right).$$

This shows that the noise power levels in the components are related to the noise power in the input signal, $\sigma^2$, and the sum of squares of filter coefficients, $\Sigma_{j=1}^{N}\alpha^2(n,j)$.

The noise levels in the two components may still be estimated if the noise is not white. Then $$\sigma_p^2(n) = a(n)^T W_N a(n), \qquad (31)$$

where $a(n) = \{\alpha_1, \alpha_2, \ldots, \alpha_N\}^T$ and $W_N$ is the N×N auto-correlation matrix of the noise. Similarly $$\sigma_e^2(n) = c(n)^T W_{N+1} c(n), \qquad (32)$$

where $c(n) = \{1, -\alpha_1, -\alpha_2, \ldots, -\alpha_N\}^T$. This requires more calculation than the white noise case. However, the noise in the prediction component and the error component can still be determined from the filter coefficients and the input noise auto-correlation matrix. The input noise auto-correlation matrix, W, may be measured during pauses in the signal, i.e. when the noisy input signal contains only noise. Alternatively the matrix may be estimated from minima in the auto-correlations of the noisy input signal.

According to one aspect of the current invention, the noise characteristics in the prediction components are determined from the noise characteristics of the input signal together with knowledge of the coefficients of the prediction filter.

Having obtained the variable noise level estimates, the gains may be calculated according to techniques known for spectral subtraction. In one such technique, used previously in the spectral subtraction method, an a priori estimate of the signal powers is found by subtracting the estimated power of noise from the total power. Additionally, an a posteriori estimate is found from the power in the attenuated component. The estimates may be combined to give the following estimates of the signal powers, $$S_p^2(n) = (1-\beta)\max(P^2(n)-\sigma_p^2(n),0)f + \beta P_+^2(n-1) \qquad (33)$$

$$S_e^2(n) = (1-\beta)\max(E^2(n)-\sigma_e^2(n),0) + \beta E_+^2(n-1), \qquad (34)$$

where $P_+^2(n-1)$ and $E_+^2(n-1)$ denote the powers in the attenuated components and $0 \leq \beta < 1$ is a parameter. ($\beta=0$ corresponding to the original spectral subtraction technique.)

Once the signal and noise estimates are known the attenuators gains may be determined. For, examples, the estimates may be used to calculate modified Wiener gains of the form $$K_p(n) = \frac{S_p^2(n)}{\max(P^2(n), \lambda\sigma_p^2(n))} \qquad (35)$$

$$K_e(n) = \frac{S_e^2(n)}{\max(E^2(n), \lambda\sigma_e^2(n))} \qquad (36)$$

where $\lambda \geq 1$ is a parameter. More generally, the gains may be any function of the present and past total and noise power estimates, and of the powers, $P_+^2(n-1)$ and $E_+^2(n-1)$, of the previous attenuated signals. The functional form is given by $$K_p(n) = F_p\{P^2(n), \sigma_p^2(n), P_+^2(n-1), P^2(n-1), \sigma_p^2(n-1), P_+^2(n-2), \ldots\} \quad (37)$$

$$K_e(n) = F_e\{E^2(n), \sigma_e^2(n), E_+^2(n-1), E^2(n-1), \sigma_e^2(n-1), E_+^2(n-2), \ldots\}.$$

This functional dependence is provided by the embodiment of the invention depicted in FIG. 3. The gain adjustment means (9), controlling the gain applied to the predictable component of the signal, is dependent upon the levels of the input signal (1), (which may be used to estimate the input noise level), the predictable component (3), the filter coefficients (40) and, optionally, the previous attenuated predictable component (41). Similarly, the gain adjustment means (10), controlling the gain of the prediction error, is dependent upon the levels of the input signal (1), the prediction error component (4), the filter coefficients (40) and, optionally, the previous attenuated prediction error component (42). The extensive literature on the spectral subtraction technique contains many examples of functions of this type, and it will be obvious, to those skilled in the art, how to design such functions without departing from the spirit of the current invention. The functional dependence may be determined via a look-up table or via a look-up table followed by interpolation. This is of particular benefit when multiple channels of processing are performed on the same processing device or on devices sharing a common memory.

Since the power levels of the signals vary more slowly than the signals themselves, it is not necessary to adjust the attenuator gains on every sampling interval. This will reduce computational requirements still further. For speech signals, for example, the gains should preferably be updated at least once every 20 ms to ensure good performance.

Estimation of Signal Levels

The signal levels may be measured via a number of techniques, often referred to as envelope detection techniques. In the simplest of these, the signal is rectified, or squared, and passed through a low pass filter, so that, for example, the level of the predictable component is updated according to $$P^2(n) = P^2(n-1) + \alpha(p^2(n) - P^2(n-1)). \quad (38)$$

A modified approach, which responds more rapidly to sudden increases in signal levels is $$P^2(n) = \begin{cases} P^2(n-1) + \alpha_1(p^2(n) - P^2(n-1)) & \text{if } p^2(n) > P^2(n-1) \\ P^2(n-1) + \alpha_2(p^2(n) - P^2(n-1)) & \text{otherwise} \end{cases} \quad (39)$$

where $0 < \alpha_2 < \alpha_1 \leq 1$ are parameters which determine the timescale of the power measured. For example, $\alpha_1 = 0.1$ and $\alpha_2 = 0.01$ have been used with an 8 kHz sampling rate in computer simulations.

The power of the input signal $x(n)$ is denoted by $X^2(n)$ and may be found in a similar fashion.

The normalization factor $\chi^2(n)$ used in the algorithm for adapting the prediction filter may be replaced by $X^2(n)$ and the step size replaced by $\mu_0/N$, so as to reduce the amount of computation required. In addition, to further reduce computation, the factor $$\mu = \frac{\mu_0/N}{e + X^2(n)}$$

need not be updated at every sample interval, since $X^2(n)$ varies more slowly than the signals themselves.

The noise power $\sigma^2$ may be found from measuring the input signal power during pauses in the speech. This requires the use of a voice activity detector (VAD). Many such detectors are known in the literature. If the system of the current invention is to be integrated in a system with other speech processing functions, use can be made of various existing detectors. Alternatively, following the approach of Graupe et al, U.S. Pat. No. 4,185,168, the noise power may be estimated from successive minima in the input power, $X^2(n)$. The minima may be estimated in various ways. One method is to use the envelope detection filter.

$$X_{min}^2(n) = \begin{cases} x^2(n) & \text{if } x^2(n) < X_{min}^2(n) \\ X_{min}^2(n) + \eta & \text{otherwise} \end{cases} \quad (40)$$

where $\eta$ is a positive increment that allows that estimate to track increasing noise levels. The noise power is taken to be some factor times the minimum value, i.e.

$$\sigma^2 = \kappa \cdot X_{min}^2(n) \quad (41)$$

where $\kappa \geq 1$. This technique avoids the need for a VAD.

Operation with Correlated (Non-White) Noise

The expressions given in equations 31 and 32 are greatly simplified when the noise is white, since then the matrices $W_N$ and $W_{N+1}$ are proportional to the identity matrix and the noise powers are given by expressions 28 and 30. The system will still provide noise reduction if these expressions are used with non-white noise, but further improvement can be made if the noise is whitened before being passed through the noise reduction filter. This may be done by adding a second prediction filter to the system.

Figure 6:
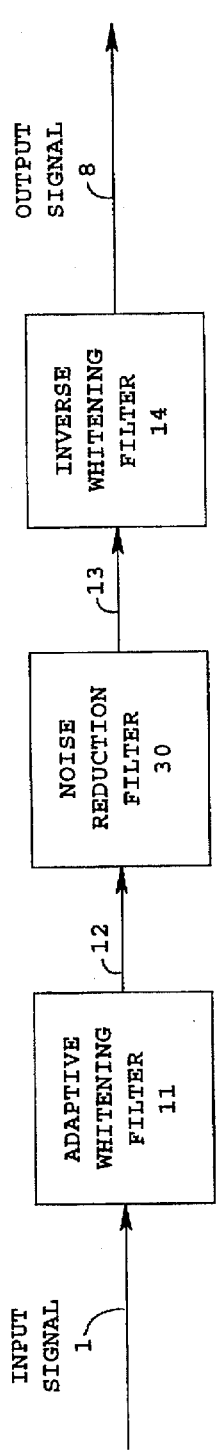
FIG. 6 is a block diagram of an embodiment of the invention for use with correlated noise.

There are two main embodiments of this improvement. The first embodiment is shown in FIG. 6.

A second adaptive prediction filter (11) is placed in before the first adaptive predictor and acts as a whitening filter. The coefficients, $b(n,k)$, of the second adaptive predictor may be adjusted in a similar manner as the first adaptive prediction filter, via a formula such as $$b(n,k) = \begin{cases} b(n-1,k), & \text{if speech is present} \\ b(n-1,k) + \mu x(n-k)e(n), & \text{otherwise.} \end{cases} \quad (42)$$

The prediction error (12) is passed to the noise reduction filter (30). During pauses, the output (12) consists of white noise only, hence the filter (11) is a whitening filter. During speech, the output comprises filtered speech plus white noise.

The output (13) from the noise reduction filter contains enhanced, filtered speech. This is passed to an inverse filter (14) which has a characteristic inverse to the second prediction filter. This filter compensates for the modifications to the speech so that the final output (8) contains enhanced speech.

If the whitening filter is implemented as a finite impulse response filter with M coefficients, $b(n,k)$, the output $u(n)$ is given by $$u(n) = x(n) - \sum_{k=1}^{M} b(n,k)x(n-k) \quad (43)$$

The inverse filter recovers the input signal $x(n)$ from $u(n)$ and can be implemented as the recursive filter $$x(n) = \sum_{k=1}^{M} b(n,k)x(n-k) + u(n). \quad (44)$$

Other forms of prediction filters, such as the lattice filter, can be also be inverted simply.

Figure 7:
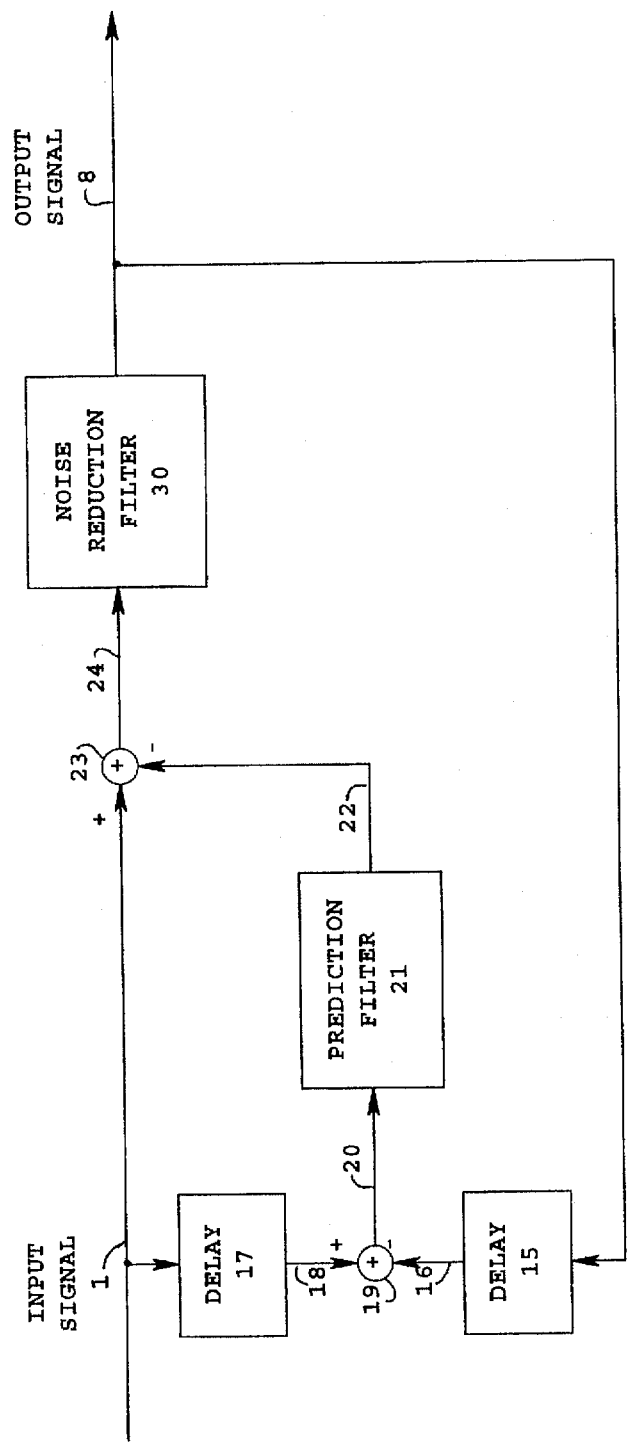
FIG. 7 is a block diagram of a further embodiment of the invention for use with correlated noise.

In an alternative embodiment, shown in FIG. 7, the use of a VAD may be avoided. The output signal (8) is delayed by delay means (15) to provide the previous output signal (16). The input signal (1) is delayed by delay means (17) to provide the previous input signal (18). The previous output signal is subtracted from the previous input signal at (19) to provide an estimate of the previous noise signal (20). This signal is passed to a noise prediction filter (21) to produce an estimate (22) of the predictable component of the current noise. This estimate is subtracted from the noisy input signal (1) at (23), such that the resulting signal (24) contains only speech and unpredictable (white) noise. This signal is then passed to the noise reduction filter (30) to provide the next enhanced speech signal (8). This embodiment also avoids the need for an inverse filter, since the input signal is not passed through the noise prediction filter.

Figure 8:
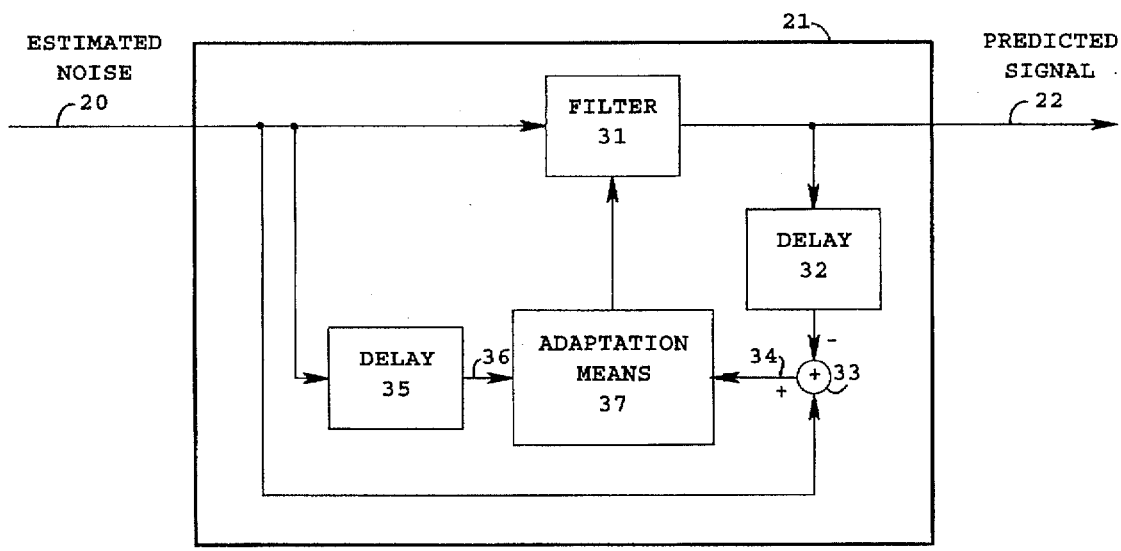
FIG. 8 is a block diagram of an auto-regressive, moving-average prediction filter used in one embodiment of the invention.

The noise prediction filter (21) has a slightly different structure to those described above since it must produce a prediction of input signal rather than just the predictable component. One embodiment of such a prediction filter is shown in FIG. 8. The estimated noise signal (20) is passed to filter (31) which produces the predicted signal (22) as output. This signal is delayed in delay means (32) to obtain the previous predicted signal. This is subtracted from the current input signal at (33) to obtain a previous prediction error signal (34). The input (20) to filter (31) is delayed in delay means (35) to obtain the previous input signal (36), i.e. the input signal that produced the previous prediction error (34). Signals (34) and (36) are used by adaptation means (37) which adjusts the coefficients of the filter (31).

EXAMPLE

By way of example, the application of the noise reduction filter to a signal containing telephone dial tones (for the ambers 4,1,0 and 7) and white noise is now described. The signal to noise ratio for the input noisy signal is about 18 dB.

Figure 9:
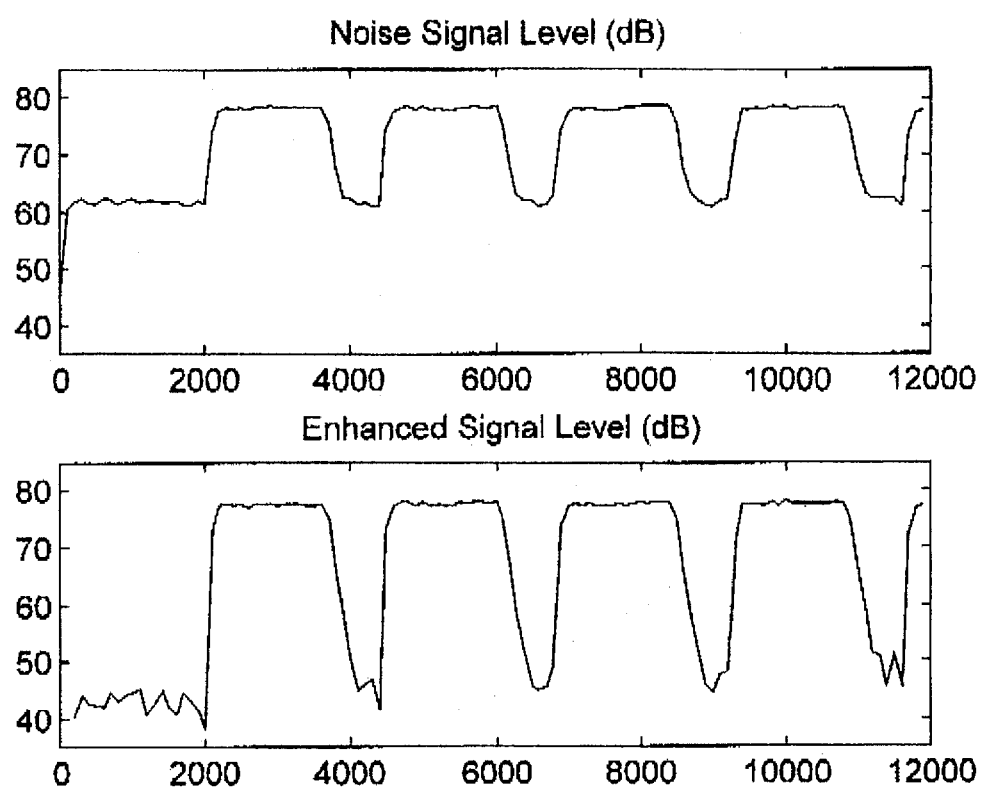
FIG. 9 is a graphical illustration of input and output signal levels for the embodiment of the invention shown in FIG. 3.

The upper plot in FIG. 9 shows the level of the noisy input signal (in decibels) as a function of the sample number. The lower plot shows the level of the enhanced signal. The signal to noise ratio of the enhanced signal is about 36 dB, so a noise reduction of about 18 dB has been achieved. This is substantially more reduction than obtained by previous systems based on Kalman filtering techniques.

Figure 10:
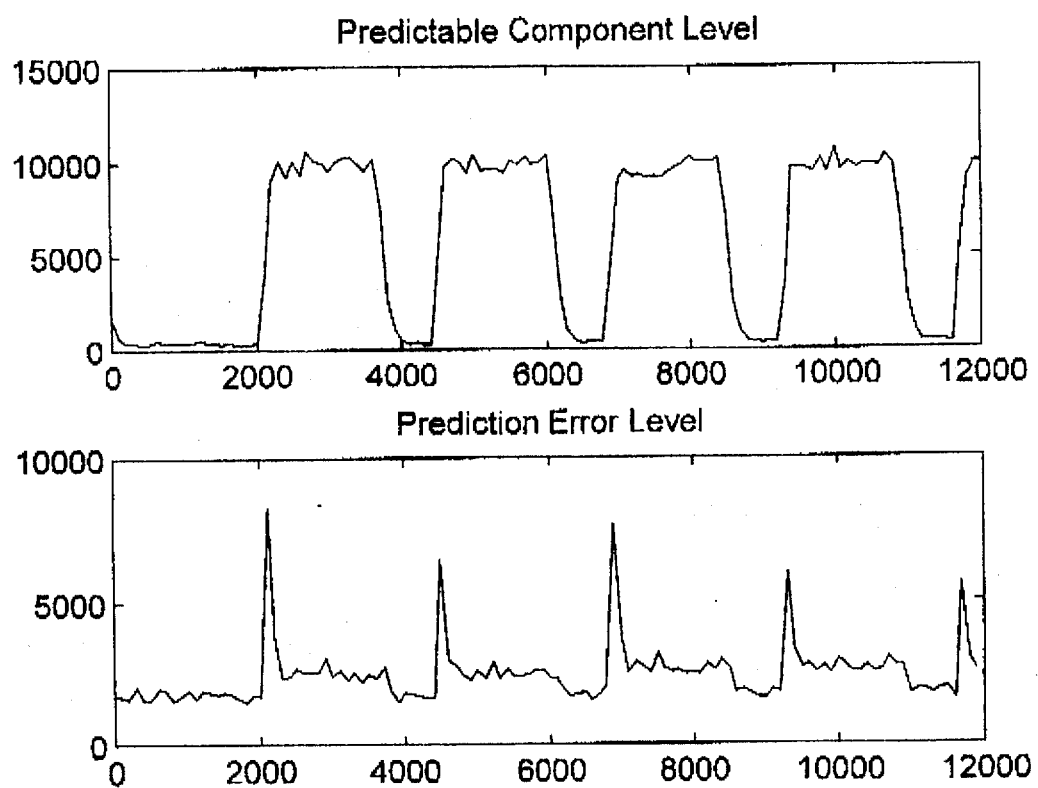
FIG. 10 is a graphical illustration of further signals levels for the embodiment of the invention shown in FIG. 3.

The root mean square level of the predictable component of the signal ((3) in FIG. 3) is shown in the upper plot of FIG. 10 as a function of sample number. A sampling rate of 8 kHz was used and 16 coefficients were used in the prediction filter. The filter was adjusted using the stochastic gradient algorithm. The root mean square level of the prediction error ((4) in FIG. 3) is shown in the lower plot of FIG. 10. It can be seen from FIG. 10 that, during the pauses between tones, the level of the prediction error component exceeds the level of the predictable component. It cannot be predicted when a dial tone will be turned on, hence the first portion of the tone cannot be predicted. Further, it takes a short time for the adaptive prediction filter to converge to its optimal value. Hence, the prediction error level, shown in the lower plot of FIG. 10, contains 'spikes' which correspond to the first part of each dial tone. Previous systems (such as Sambur) using the predictable component as the enhanced output signal, would remove these 'spikes'. Stated differently, these spikes constitute the transient part of the signal and are lost if the predictable component alone is used to derive the output signal.

It may also be seen from the lower plot of FIG. 10 that, the apart from the spikes, the level of noise in the prediction error is higher when a dial tone is present. Previous systems (such as Boll) which use the spectral subtraction technique rely on the assumption that the noise level is constant. This is not true for the system of the current invention, since the adaptive prediction filter has a time-varying characteristic. In the current invention the varying noise level is estimated from the noise level in the noisy input signal and the coefficients of the adaptive prediction filter.

Figure 11:
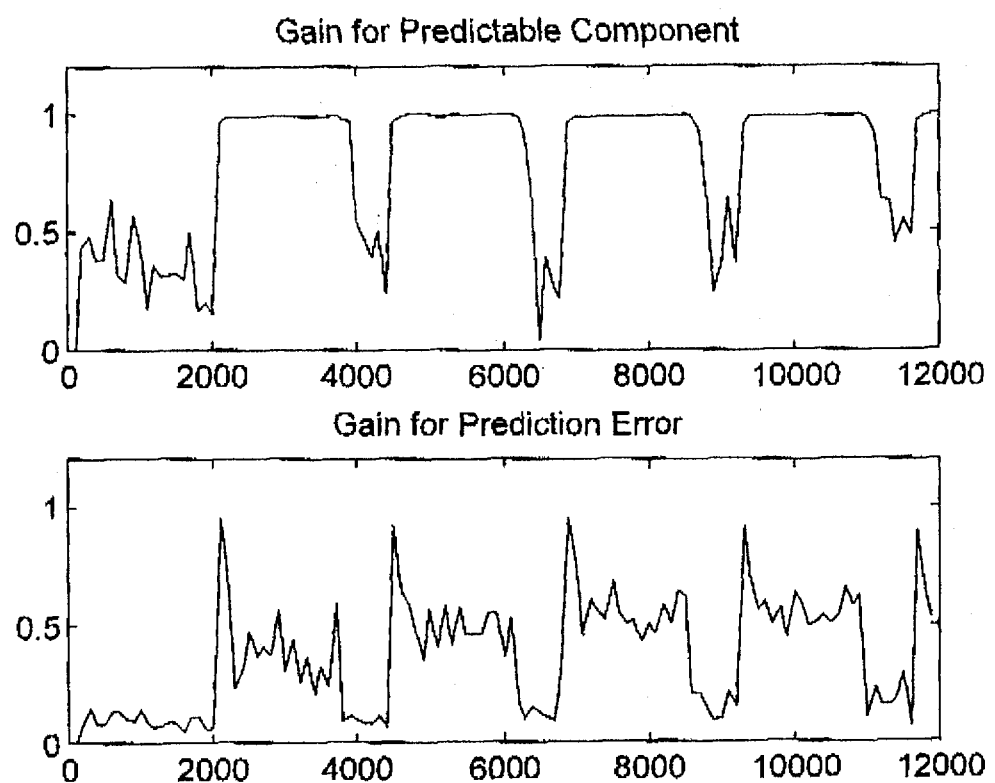
FIG. 11 is a graphical illustration of attenuator gains for the embodiment of the invention shown in FIG. 3.

In the system of the current invention, both components are multiplied by gains (attenuated) and combined to form the enhanced output signals. The gains are shown in FIG. 11, again as a function of sample number. The upper plot shows the gain for the predictable component. It can be seen that the gain is close to unity when the signal is present, but is reduced when the signal is absent. If computational requirements must be minimized, this gain can be fixed at unity or fixed dependent upon the long term characteristics of the signals. The lower plot shows the gain for the prediction error. The gain is close to unity at times corresponding to the transient peaks in the prediction error (see FIG. 10). This means that, unlike previous systems, the signal transients are not lost. This aspect is particularly important for speech and music applications, where the transients are associated with intelligibility and clarity. The gain is reduced during the steady portion of the signal, and reduced still further during the pauses in the signal.

While a preferred embodiment of the invention has been shown and described, the invention is not to be limited by the above exemplary disclosure, but only by the following claims.

What is claimed is:

1. A method for enhancing a noisy signal, said noisy signal including a noise element and a signal element, comprising the steps of passing said noisy signal through a first adaptive prediction filter so as to obtain a first signal component corresponding to a predictable component of said noisy signal and a second signal component corresponding to a prediction error, passing the first signal component through a first attenuator to obtain a first attenuated signal component, passing the second signal component through a second attenuator to obtain a second attenuated signal component and combining the first and second attenuated signal components to form an enhanced output signal.

2. A method as in claim 1 in which the gain of second attenuator is adjusted according to estimates of the noise level in said noisy signal and the level of said second signal component and in which the first attenuator has a fixed gain.

3. A method as in claim 1 in which the gain of the first attenuator is adjusted according to an estimate of the noise level in said first signal component and the level of the first signal component, and the gain of the of second attenuator is adjusted according to an estimate of the noise level in said second signal component and the level of the second signal component.

4. A method as in claim 3 in which the estimates of the noise levels in said first and second signal components are determined from estimates of the characteristics of said noise element and from the coefficients of said first adaptive prediction filter.

5. A method as in claim 3 in which the gains of said first and second attenuators are further responsive to previous levels of the first and second attenuated signals.

6. A method as in claim 1 in which the first adaptive prediction filter is adapted via a gradient descent algorithm.

7. A method as in claim 1 in which the first adaptive prediction filter includes a moving average filter.

8. A method as in claim 1 in which the first adaptive prediction filter includes a modified auto-regressive moving average filter, which is responsive to a previous value of the enhanced output signal.

9. A method as in claim 1 in which the first adaptive prediction filter includes a modified auto-regressive moving average filter, which is responsive to a previous value of the attenuated first signal component.

10. A method as in claim 1 in which the first adaptive prediction filter includes a lattice filter.

11. A method as in claim 1 in which the first adaptive prediction filter includes a non-linear filter such as an artificial neural network.

12. A method for enhancing a noisy signal, said noisy signal including a noise element and a signal element, comprising the steps of:

passing said noisy signal through a whitening filter so as to whiten said noise element, passing the output of said whitening filter through a first adaptive prediction filter so as to obtain a first signal component corresponding to the predictable component of said noisy signal and a second signal component corresponding to a prediction error, passing said first signal component through a first attenuator to obtain a first attenuated signal component, passing said second signal component through a second attenuator to obtain a second attenuated signal component, combining said first and second attenuated signal components to form a first output signal, and passing said first output signal through an inverse whitening filter to obtain an enhanced output signal, wherein said whitening filter is adapted dining pauses in said signal element and the coefficients of the inverse whitening filter are determined by the coefficients of the whitening filter.

13. A method for enhancing a noisy signal, said noisy signal including a noise element and a signal element, comprising the steps of:

subtracting from said noisy signal an estimate of the predictable part of said noise element so as to obtain a modified noisy signal, passing said modified noisy signal through a first adaptive prediction filter so as to obtain a first signal component corresponding to the predictable component of said noisy signal and a second signal component corresponding to a prediction error, passing said first signal component through a first attenuator to obtain a first attenuated signal component, passing said second signal component through a second attenuator to obtain a second attenuated signal component, combining said first and second attenuated signal components to form a first output signal, and passing said first output signal through an inverse whitening filter to obtain an enhanced output signal.

14. A method as in claim 13 in which the predictable part of said noise component is obtained by subtracting a previous enhanced output signal from a previous sample of the noisy signal so as to obtain an estimate of the previous noise component, and passing said estimate of the previous noise component through a prediction filter.

15. A noise reduction filter for enhancing a noisy signal, said noisy signal including a noise element and a signal element, said filter comprising:

a first adaptive prediction filter which is responsive to said noisy signal and produces as outputs a first signal component corresponding to a predictable component and a second signal component corresponding to a prediction error, a first attenuator acting on said first signal component to produce a first attenuated signal component, a second attenuator acting on said second signal component to produce a second attenuated signal component, and a signal combiner for combining the first and second attenuated signal components to form an enhanced output signal.

16. A noise reduction filter as in claim 15, and further including gain adjustment means which adjusts the gain of said second attenuator according to estimates of the noise level in said second signal component and the level of said second signal component.

17. A noise reduction filter as in claim 15, which further includes first gain adjustment means which adjusts the gain of the first attenuator according to estimates of the noise level in said first signal component and the level of the first signal component and second gain adjustment means which adjusts the gain of the of the second attenuator according to an estimate of the noise level in said second signal component and the level of said second signal component.

18. A noise reduction filter in claim 17 in which the estimates of the noise levels in said first and second signal components are determined from estimates of the characteristics of said noise element and from the coefficients of said first prediction filter.

19. A noise reduction filter as in claim 17 in which the gains of said first and second attenuators also depend upon previous levels of the first and second attenuated signals.

20. A noise reduction filter as in claim 15 which includes filter adaptation means which adapts the coefficients of said first adaptive prediction filter according to a gradient descent algorithm so that the filter operates to predict the signal element of said noisy signal.

21. A noise reduction filter as in claim 15 in which the first prediction filter includes a moving average filter.

22. A noise reduction filter as in claim 15 in which the first prediction filter includes a modified auto-regressive moving average filter which is responsive to said enhanced output signal.

23. A noise reduction filter as in claim 15 in which the first prediction filter includes a modified auto-regressive moving average filter which is responsive to said attenuated first signal component.

24. A noise reduction filter as in claim 15 in which the first prediction filter includes a lattice filter.

25. A noise reduction filter as in claim 15 in which the first prediction filter includes a non-linear filter such as an artificial neural network.

26. A noise reduction filter for enhancing a noisy signal, said noisy signal including a noise element and a signal element, said filter comprising:

a whitening filter which operates on said noisy signal to produce a modified noisy signal which contain white noise, a first adaptive prediction filter which is responsive to said modified noisy signal and produces as outputs a first signal component corresponding to a predictable component and a second signal component corresponding to a prediction error, a first attenuator acting on said first signal component to produce a first attenuated signal component, a second attenuator acting on said second signal component to produce a second attenuated signal component, a signal combiner for combining the first and second attenuated signal components to form a first output signal, and an inverse whitening filter which operates on said first output signal to produce an enhanced output signal, wherein said whitening filter is adapted during pauses in said signal element and the coefficients of the inverse whitening filter are determined by the coefficients of the whitening filter.

27. A noise reduction filter for enhancing a noisy signal, said noisy signal including a noise element and a signal element, said filter comprising:

a subtraction means for subtracting from said noisy speech an estimate of the predictable part of said noise element so as to obtain a modified noisy signal, a first adaptive prediction filter which is responsive to said modified noisy signal and produces as outputs a first signal component corresponding to a predictable component and a second signal component corresponding to a prediction error, a first attenuator acting on said first signal component to produce a first attenuated signal component, a second attenuator acting on said second signal component to produce a second attenuated signal component, and a signal combiner for combining the first and second attenuated signal components to form an enhanced output signal.

28. A noise reduction filter as in claim 27 which further includes:
  first delay means to provide a previous enhanced output signal from said enhanced output signal,
  second delay means to provide a previous noisy signal from said noisy signal,
  second subtraction means for subtracting a previous enhanced output signal from a previous noisy signal so as to obtain an estimate of the previous noise component, and
  a second adaptive prediction filter which acts on the estimate of the previous noise component to provide said estimate of the predictable part of said noise component.

* * * * *